A. R. RUMOHR.
TENON MACHINE GAGE.
APPLICATION FILED JULY 9, 1913.
1,082,048.     Patented Dec. 23, 1913.
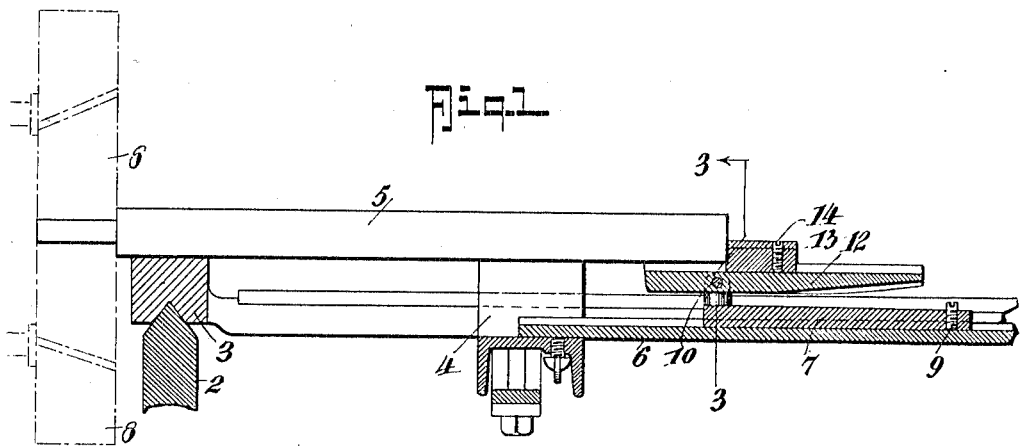
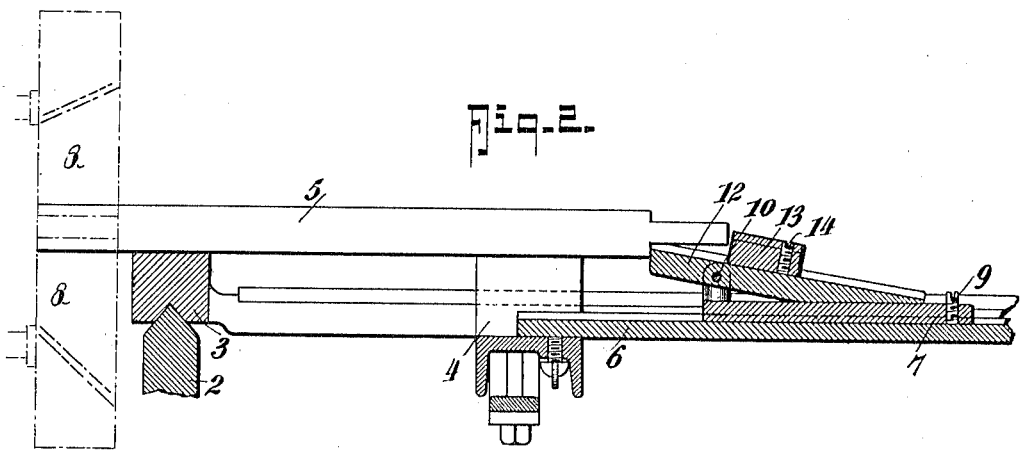
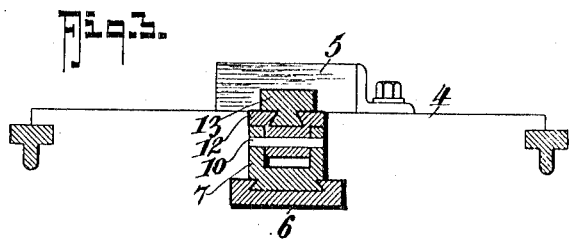
WITNESSES:
John J. Schrott
Charles J. Diller
INVENTOR
Anson R. Rumohr.
BY
Fred G. Dieterich
ATTORNEYS.

UNITED STATES PATENT OFFICE.

ANSON ROBERT RUMOHR, OF VANCOUVER, BRITISH COLUMBIA, CANADA.

TENON-MACHINE GAGE.

1,082,048.

Specification of Letters Patent.

Patented Dec. 23, 1913.

Application filed July 9, 1913. Serial No. 778,182.

*To all whom it may concern:*

Be it known that I, ANSON R. RUMOHR, citizen of the Dominion of Canada, residing at the city of Vancouver, in the Province of British Columbia, Canada, have invented certain new and useful Improvements in Tenon-Machine Gages, of which the following is a specification.

This invention relates to a stop gage for a wood tenoning machine and is designed to gage the length of the tenon in the first cut at one end of the stock and in the second cut, on the opposite end of the stock, the distance between the shoulders of the tenons, the gage stop being designed to automatically fall of its own accord to the position required for the second cut, when the work is lifted to present the opposite end to the cutters.
The invention is particularly described in the following specification, reference being made to the drawings by which it is accompanied, in which:

Figure 1 is a sectional elevation of the gage with a piece of work in it presented to the tenon cutting heads to cut the first tenon. Fig. 2, a similar view as required to cut the tenon on the other end, and Fig. 3 is a cross section on the line 3—3 in Fig. 1.
In these drawings 2 represents the frame of the machine, 3 the traversing carriage and 4 the bridge upon the upper side of which the stock 5 rests which it is desired to tenon. This bridge also supports the forward end of the gage stop bar 6. The upper and lower cutter heads are represented by 8.

Slidably mounted in a dovetailed groove of the gage bar 6 is a base member 7 having a set screw 9 by which it may be secured in any desired position of lengthwise adjustment and lugs upwardly projecting from it to carry a fulcrum pin 10 on which is mounted a shoulder gage member 12 having on its upper side a dovetailed groove extending lengthwise from end to end, in which groove a tenon length gage member 13 is movable and may be secured in any desired position of lengthwise adjustment by a set screw 14. The after end of the member 12 from the pin 10 is longer than the forward, so that when free it normally falls to the angular position, as shown in Fig. 2, and projects its front end above the level of the work seat.

In use, the shoulder gage member is adjusted with the front end of 12 at a distance from the cutter heads 8 to give the required distance between the shoulders of the tenons, and the stop 13 is adjusted in its distance from the end of 12 to the required length of the tenon, or to divide the difference between the length of the stock and the distance between the tenon shoulders. The work 5 to be tenoned is then placed upon the upper side of the member 12 with the end of it against the stop 13, as shown in Fig. 1, and after the tenon has been cut on one end of the stock, it is reversed in its position. When the stock 5 is lifted off the end of the gage stop 12 to reverse the position of the stock, the unbalanced outer end of 12 will fall and will project the shoulder gage end of 12 above the level of the stock seat on the gage bar 6, and against this upwardly projecting end the shoulder of the tenon, which has been cut, is placed, as shown in Fig. 2. The distance from the end of 12 has been adjusted to the required distance between the tenon shoulders, so that the second tenon is cut to what is required.

The gage is simple to manufacture and in its action and is not liable to derangement.

Where found necessary, the width of the gage stops may be such as will enable two pieces of the stock to be tenoned at one time.

Having now particularly described my invention, and the manner of its use, I hereby declare that what I claim as new and desire to be protected in by Letters Patent, is:

1. A tenon gage, comprising a base member slidably adjustable on the table of the machine, a tenon shoulder stop pivotally mounted on the base member and overbalanced so that the end toward the tenon cutters will when free project above the seat of the stock on the machine table, and a tenon length stop adjustably mounted on the shoulder gage member.

2. A tenon gage, comprising a base member slidably fitting a groove in the gage bar and means for securing the same in any desired position of lengthwise adjustment, a tenon shoulder stop pivotally mounted on the base member the end of said stop projecting toward the cutters beyond the corresponding end of the base member, said shoulder stop being overbalanced whereby to project the projecting end of the shoulder gage stop above the seat of the stock and a tenon end stop adjustably secured on the shoulder gage stop.

3. A tenon gage stop, comprising a base member slidably fitting a groove in the gage bar and having means for securing it in any desired position of lengthwise adjustment therein, a tenon shoulder stop so pivotally mounted on the base member that the end toward the tenon cutters will when free project above the seat of the stock on the machine said shoulder gage member lengthwise grooved, and a tenon end gage member slidably mounted on the shoulder gage member and having provision for lengthwise adjustment thereon.

4. In combination with a table having a slot, of a tenon gage comprising a base member mounted for movement in said slot, a lug on said base member, a tenon shoulder stop pivotally mounted on said lug and overbalanced at one end to cause its other end to normally project above the seat of the stop on the machine table, said tenon shoulder stop having a longitudinal groove, and a tenon end stop having a tongue slidably mounted in said longitudinal groove, means for securing said tenon end stop in position, and means for securing said base member in position.

In testimony whereof I affix my signature in presence of two witnesses.

ANSON ROBERT RUMOHR.

Witnesses:
  ROWLAND BRITTAIN,
  MAY WHYTE.

---

Copies of this patent may be obtained for five cents each, by addressing the "Commissioner of Patents, Washington, D. C."